(12) United States Patent
Yamane et al.

(10) Patent No.: US 9,217,059 B2
(45) Date of Patent: Dec. 22, 2015

(54) METHOD FOR PREPARING A COMPOSITION COMPRISING PERFLUOROPOLYETHER HAVING A CARBOXYL GROUP AT ONE TERMINAL

(71) Applicant: Shin-Etsu Chemical Co., Ltd., Tokyo (JP)

(72) Inventors: Yuji Yamane, Annaka (JP); Yasunori Sakano, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/615,171

(22) Filed: Feb. 5, 2015

(65) Prior Publication Data
US 2015/0218311 A1 Aug. 6, 2015

(30) Foreign Application Priority Data

Feb. 6, 2014 (JP) ................................. 2014-021355
Apr. 23, 2014 (JP) ................................. 2014-089380

(51) Int. Cl.
*C08C 2/04* (2006.01)
*C08G 65/00* (2006.01)
*C08G 65/30* (2006.01)
*C08G 75/02* (2006.01)
*C08G 65/323* (2006.01)

(52) U.S. Cl.
CPC .............. *C08G 65/00* (2013.01); *C08G 65/007* (2013.01); *C08G 65/30* (2013.01); *C08G 65/3236* (2013.01)

(58) Field of Classification Search
CPC ................................... C08F 6/02; C08G 2/04
USPC ......................................................... 528/482
See application file for complete search history.

(56) References Cited

U.S. PATENT DOCUMENTS

2012/0077041 A1 3/2012 Yamane et al.
2012/0270057 A1 10/2012 Yamane et al.

FOREIGN PATENT DOCUMENTS

| JP | 2001-164279 A | 6/2001 |
| JP | 2009-532432 A | 9/2009 |
| JP | 2012-72272 A | 4/2012 |
| JP | 2012-233157 A | 11/2012 |
| WO | WO 2007/113293 A1 | 10/2007 |

*Primary Examiner* — Terressa Boykin
(74) *Attorney, Agent, or Firm* — Birch, Stewart, Kolasch & Birch, LLP

(57) ABSTRACT

An object of the present invention is to provide a method for efficiently and highly selectively preparing a composition comprising a perfluoropolyether having a carboxyl group at one terminal at a higher ratio. The present invention provides a method for increasing a ratio of a perfluoropolyether having a carboxyl group at one terminal, relative to a total amount of the perfluoropolyether having a carboxyl group at one terminal and a perfluoropolyether having carboxyl groups at both terminals in a composition comprising these perfluoropolyethers, wherein the method comprises a step of subjecting the composition to chromatography in which a moving phase is supercritical or subcritical state carbon dioxide of the specific temperature and the specific pressure, and a stationary phase is silica gel to thereby collect a fraction containing the perfluoropolyether having a carboxyl group at one terminal at a higher ratio. Further, present invention provides for increasing a ratio of a perfluoropolyether having a carboxyl group at one terminal, relative to a total amount of the perfluoropolyether having a carboxyl group at one terminal, a perfluoropolyether having carboxyl groups at both terminals and a perfluoropolyether having no carboxyl group at any terminal perfluoropolyether, in a composition comprising these perfluoropolyethers, wherein the method comprises a step of subjecting the composition to chromatography in which a moving phase is supercritical or subcritical state carbon dioxide of the specific temperature and the specific pressure, and a stationary phase is silica gel to thereby collect a fraction containing the perfluoropolyether having a carboxyl group at one terminal at a higher ratio.

12 Claims, No Drawings

METHOD FOR PREPARING A COMPOSITION COMPRISING PERFLUOROPOLYETHER HAVING A CARBOXYL GROUP AT ONE TERMINAL

CROSS REFERENCE

This application claims the benefits of Japanese Patent application Nos. 2014-021355 filed on Feb. 6, 2014 and 2014-089380 filed on Apr. 23, 2014, the contents of which are hereby incorporated by reference.

FIELD OF THE INVENTION

The present invention relates to a method for preparing a composition comprising a perfluoropolyether having a carboxyl group at one terminal at a higher ratio.

BACKGROUND OF THE INVENTION

Perfluoropolyethers having a functional group at one terminal, hereinafter referred to as "one-terminal functional derivative", and perfluoropolyethers having functional groups at both terminals, hereinafter referred to as "both-terminal functional derivative", hereinafter collectively referred to as "functionalized polymer", are generally used as a precursor of various derivatives for surfactants and surface treatment agents. For instance, examples of a precursor of surfactants which are useful for polymerization include acryl derivatives, amine derivatives and isocyanate derivatives of the functionalized polymer. Further, alkoxy derivatives, chlorine derivatives and silazane derivatives of the functionalized polymer are used as a precursor of surface treatment agents.

Properties of the one-terminal functional derivatives are different from that of the both-terminal functional derivatives. For instance, the both-terminal functional derivatives cause extension of a chain or gelation, but the one-terminal functional derivatives do not cause such actions. Further, a composition comprising a polymer having no functional group at any terminal, referred to as "non-functionalized polymer", has a problem such that the composition is not sufficiently cured. Accordingly, it is industrially important to increase a content of the functionalized polymer in a composition. In the present specification, "functional" or "functionalized" means "having a reactive functional group" and "non-functionalized" means "having no reactive functional group".

The preparation of a perfluoropolyether having the structure, $-(OCF_2)_p(OCF_2CF_2)_q(OCF_2CF_2CF_2)_r(OCF_2CF_2CF_2CF_2)_s-$, in a main chain and a functional group at one terminal is difficult. In the aforesaid structure, p and q are, independently of each other, an integer of from 5 to 300, r and s are, independently of each other, an integer of from 0 to 80, and a total of p, q, r and s is 10 to 500. Japanese National Phase Publication No. 2009-532432, Patent literature 1, describes that the preparation of a composition comprising a one-terminal functionalized perfluoropolyether in the specific content, comprising steps of preparing a mixture of a one-terminal functionalized perfluoropolyether, a both-terminal functionalized perfluoropolyether and a non-functionalized perfluoropolyether by fluorinating a part of functional groups of a both-terminal functionalized perfluoropolyether and, then, subjecting the mixture to distillation. However, in the method described in Patent literature 1, the separation is caused by making use of difference of boiling points of the components, so that the method cannot be used when the molecular weight distribution of at least one of perfluoropolyethers is wide. The upper limit of the molecular weight is such that the perfluoropolyether can be distributed. The upper limit of the average molecular weight in the Examples described in Patent literature 1 is approximately 1,000. Therefore, it is difficult to apply the method to a perfluoropolyether having a larger molecular weight.

The preparation of a composition comprising a one-terminal functionalized perfluoropolyether in a higher content without any limitation on a molecular weight and a molecular weight distribution is useful for preparing materials such as surface treatment agents, lubricants, and elastomers. Therefore, development of a method for preparing a composition comprising a one-terminal functionalized perfluoropolyether in a higher content is desired.

Japanese Patent Application Laid-Open No. 2012-233157, Patent literature 2, and Japanese Patent Application Laid-Open No. 2012-72272, Patent literature 3, describe a method such that a mixture of a one-terminal functionalized polymer, a both-terminal functionalized polymer and a non-functionalized polymer, in which the content of the one-terminal functionalized polymer is large, is prepared by fluorinating a part of functional groups of a both-terminal functionalized polymer and, then, a non-functionalized polymer is removed. Patent literatures 2 and 3 state that in the step of fluorinating a part of functional group, the fluorination can be controlled by adjusting the amount of the fed fluorine gas to thereby decrease an amount of the remaining both-terminal functionalized polymer, so that, a composition comprising a one-terminal functionalized polymer in a large amount can be prepared. However, a lot of non-functionalized polymers are also formed in this method. Patent literatures 2 and 3 also describe removal of the non-functionalized polymers by adsorption with an ion-exchange resin or thin-film distillation.

Japanese Patent Application Laid-Open No. 2001-164279, Patent literature 4, describes a method for the preparation of a fluorinated lubricant used in magnetic recording media, wherein a fluorinated lubricant with an introduced functional groups, such as a piperonyl group, at the both terminals is subjected to chromatography in which a moving phase is supercritical state carbon dioxide and a stationary phase is silica gel to collect plural fractions and, then, a fraction having large amounts of a functional group is selected to thereby obtain the fluorinated lubricant having large amounts of a functional group, in particular, 95% or more, based on a total amount of terminal groups. Patent literature 4 states that the percentage of the terminal modification of the both-terminal functionalized polymer is increased from approximately 90% to 99% according to the method.

PRIOR LITERATURES

Patent literature 1: Japanese National Phase Publication No. 2009-532432
Patent literature 2: Japanese Patent Application Laid-Open No. 2012-233157
Patent literature 3: Japanese Patent Application Laid-Open No. 2012-72272
Patent literature 4: Japanese Patent Application Laid-Open No. 2001-164279

SUMMARY OF THE INVENTION

Problems to be Solved by the Invention

However, the adsorption process with an ion-exchange resin described in Patent literatures 2 and 3 needs an ion-exchange resin approximately twice and a fluorine solvent nine times as much as the polymer, and further needs hydrochloric acid. Therefore, this method is unsuitable to mass production and suffers from a bad manufacturing efficiency. Further, the fluorine solvent is expensive and has a high risk on workers and the environment. Further, it is sometimes difficult to remove ions and organic substances eluted from the ion-exchange resin. In a thin-film, separation occurs on account of difference of boiling points and, therefore, efficiency of the separation is bad. In particular, when the polymer has a larger molecular weight, the deference of boiling points on account of the presence or absence of the functional group is less, so that the separation is more difficult. Accordingly, properties of a product are poorer.

The method described in Patent literature 4 is suitable to remove a non-functional perfluoropolyether so as to prepare a composition comprising a both-terminal functionalized polymer in a higher content. However, it is difficult to selectively and efficiently obtain a composition comprising a one-terminal functionalized polymer in a higher content.

An object of the present invention is to provide a method for efficiently and highly selectively preparing a composition comprising a perfluoropolyether having a carboxyl group at one terminal at a higher ratio.

Means to Solve the Problems

Carbon dioxide has a critical temperature of 31.1 degrees C. and a critical pressure of 7 MPa and, therefore, becomes supercritical at milder conditions, compared to other materials, so that it is easier handle. A density of a supercritical fluid changes depending on a temperature and a pressure. Therefore, it is possible to control its solute dissolution property so as to dissolve perfluoropolyethers. The solubility of perfluoropolyethers in supercritical state carbon dioxide depends on types of functional groups and the presence or absence of a functional group. Further, the solubility depends on the molecular weight. A compound having a smaller molecular weight tends to solve in milder conditions. Therefore, it is very difficult to separate polymers having a large molecular weight distribution by types of functional groups or presence or absence of the functional group in supercritical extraction. It is necessary to make a molecular weight distribution smaller in advance.

Now, the present inventors have found a process where terminal functionalized groups of perfluoropolyethers is converted into a carboxyl group in advance and a composition comprising these perfluoropolyethers is subjected to chromatography in which a moving phase is supercritical or subcritical state carbon dioxide of the specific temperature and the specific pressure and a stationary phase is silica gel to thereby separate perfluoropolyethers efficiently by the presence or absence of the carboxyl group, so that a fraction containing the perfluoropolyether having a carboxyl group at one terminal at a higher ratio is easily obtained.

Thus, the present invention provides a method for increasing a ratio of a perfluoropolyether having a carboxyl group at one terminal, relative to a total amount of the perfluoropolyether having a carboxyl group at one terminal and a perfluoropolyether having carboxyl groups at both terminals in a composition comprising these perfluoropolyethers, wherein the method comprises a step of subjecting the composition to chromatography in which a moving phase is a supercritical or subcritical state carbon dioxide and a stationary phase is silica gel, and the moving phase is at a constant temperature, T, in a range of from 25 degrees C. to 150 degrees C. and a constant pressure, P, in a range of from 7 MPa to 30 MPa to thereby collect a fraction containing the perfluoropolyether having a carboxyl group at one terminal at a higher ratio, hereinafter referred to as the first method.

Further, the present invention provides a method for increasing a ratio of a perfluoropolyether having a carboxyl group at one terminal, relative to a total amount of the perfluoropolyether having a carboxyl group at one terminal, a perfluoropolyether having carboxyl groups at both terminals and a perfluoropolyether having no carboxyl group at any terminal, hereinafter referred to as a non-functionalized perfluoropolyether, in a composition comprising these perfluoropolyethers, wherein the method comprises a step of subjecting the composition to chromatography in which a moving phase is a supercritical or subcritical state carbon dioxide and a stationary phase is silica gel and the chromatography comprises the following step (i') or (ii'):

(i') the moving phase is at a constant temperature, $T_0$, of 25 degrees C. or higher to 150 degrees C. or lower and a constant pressure, $P_1$, of 7 MPa or higher to lower than 30 MPa to thereby collect a fraction containing the non-functionalized perfluoropolyether at a higher ratio and, subsequently, the pressure of the moving phase is increased to a constant temperature, $P_2$, which is higher than 7 MPa to 30 MPa or lower and is higher than the aforesaid pressure $P_1$ to thereby collect a fraction containing the perfluoropolyether having a carboxyl group at one terminal at a higher ratio;

(ii') the moving phase is at a constant temperature, $T_1$, of higher than 25 degrees C. to 150 degrees C. or lower and a constant pressure, $P_0$, of 7 MPa or higher to 30 MPa or lower to thereby collect a fraction containing the non-functionalized perfluoropolyether at a higher ratio and, subsequently, the temperature of the moving phase is decreased to a constant temperature, $T_2$, which is 25 degrees C. or higher to lower than 150 degrees C. and is lower than the aforesaid temperature $T_1$ to thereby collect a fraction containing the perfluoropolyether having a carboxyl group at one terminal at a higher ratio, hereinafter referred to as the second method.

Effects of the Invention

According to the present methods, a composition comprising the perfluoropolyether having a carboxyl group at one terminal at a higher ratio is efficiently obtained. In the present method, a limitation of a molecular weight is small, so that the method can be applied to a perfluoropolyether having a wide molecular weight distribution. Further, the present method decreases an amount of fluorine solvent used, so that influence to environmental burden is small and is suitable to a mass production.

BEST MODE OF THE INVENTION

The present invention will be described below in detail.

The first invention is a method for purifying a composition comprising the perfluoropolyether having a carboxyl group at one terminal and the perfluoropolyether having carboxyl groups at both terminals. This method is characterized by the step of subjecting the composition to chromatography in which a moving phase is a supercritical or subcritical state carbon dioxide and a stationary phase is silica gel, hereinafter referred to as "a supercritical chromatography", and the moving phase is at a constant temperature, T, in a range of from 25 degrees C. to 150 degrees C., preferably at higher than 25 degrees C. to lower than 150 degrees C., and a constant pressure, P, in a range of from 7 MPa to 30 MPa, preferably at higher than 7 MPa to lower than 30 MPa, to thereby collect a fraction containing the perfluoropolyether having a carboxyl group at one terminal at a higher ratio.

In the first method, the aforesaid chromatography may further comprise the following step (i) or (ii) after collecting the fraction in the aforesaid process.

(i) The pressure of the moving phase is increased to a constant pressure, P', which is higher than 7 MPa to 35 MPa or lower and is higher than the aforesaid pressure P to thereby collect a fraction containing the perfluoropolyether having carboxyl groups at both terminals at a higher ratio. In this step, the temperature of the moving phase remains at the aforesaid temperature T. The temperature may slightly change.

(ii) The temperature of the moving phase is decreased to a constant temperature, T', which is 25 degrees C. or higher to lower than 100 degrees C. and is lower than the aforesaid temperature T to thereby collect a fraction containing the perfluoropolyether having carboxyl groups at both terminals at a higher ratio. In this step, the pressure of the moving phase remains at the aforesaid pressure P. The pressure may slightly change.

According to the aforesaid step (i) or (ii), a fraction containing a large amount of the perfluoropolyether having carboxyl groups at both terminals can be collected.

According to the aforesaid process, a fraction containing the perfluoropolyether having a carboxyl group at one terminal at a higher ratio is collected. That is, the content of the perfluoropolyether having a carboxyl group at one terminal in the composition increases. The aforesaid higher ratio means that the composition comprises the perfluoropolyether having a carboxyl group at one terminal preferably at 80 mole % or more, more preferably 90 mole % or more, further preferably 95 mole % or more, relative to a total mole of the perfluoropolyether having a carboxyl group at one terminal and the perfluoropolyether having carboxyl groups at both terminals. In the present invention, the pressure of the moving phase means the pressure of the moving phase in a high pressure vessel and the temperature of the moving phase means the temperature of the moving phase in a high pressure vessel.

The carbon dioxide used as a moving phase is in a supercritical or subcritical state. Carbon dioxide has the critical temperature of 31.1 degrees C. and the critical pressure of 7 MPa. In the present invention, the carbon dioxide may be in a subcritical state and not is limited to be in a supercritical state. The pressure of the carbon dioxide in the present invention is in the range of from 7 MPa to 35 MPa, preferably in the range of from 8 MPa to 30 MPa. The temperature of the carbon dioxide is in the range of from 25 degrees C. to 150 degrees C., preferably in the range of from 30 degrees C. to 100 degrees C. The flow rate of the moving phase may be properly selected and not limited to any particular one. In a case where a volume of an extraction vessel used is large, a large flow rate is preferred. The volume of the extraction vessel may be properly selected, depending on an amount of the composition to be purified.

In the process comprising the aforesaid step (i), the temperature of the moving phase is preferably fixed. When the temperature is fixed, the solubility of the compound having a functional group in the moving phase is higher with a higher pressure of the moving phase. The pressures of the moving phase, P and P', are set, depending on the molecular weight of the polymer contained in the composition and the extraction temperature T. For instance, when the polymer contained in the composition has a weight average molecular weight of 1,000 to 15,000, the extraction temperature T may be in the range of from 25 degrees C. to 150 degrees C., preferably in the range of from 30 degrees C. to 80 degrees C., and the pressure P is a constant pressure of 7 MPa or more to 30 MPa or less, preferably more than 7 MPa to less than 30 MPa, further preferably 8 MPa or more to 25 MPa or less, and the pressure P' is a constant pressure of 8 MPa or more to 35 MPa or less, preferably 10 MPa or more to 30 MPa or less, further preferably 15 MPa or more to 30 MPa or less, provided that the pressure P' is higher than the pressure P. In this process, the pressure may be changed in stages between the pressure P and P'.

In the process comprising the aforesaid step (ii), the pressure of the moving phase is preferably fixed. When the pressure is fixed, the solubility of the compound having a functional group in the moving phase is higher with a lower temperature of the moving phase. The temperatures of the moving phase, T and T', are set, depending on the molecular weight of the polymer contained in the composition and the extraction pressure P. For instance, when the polymer contained in the composition has a weight average molecular weight of 1,000 to 15,000, the extraction pressure P may be in the range of from 7 MPa to 30 MPa, preferably in the range of from 8 MPa to 25 MPa, and the temperature T is a constant temperature of 28 degrees C. or more to less than 150 degrees C., preferably 30 degrees C. or more to 100 degrees C. or less, further preferably 30 degrees C. or more to 80 degrees or less, and the temperature T' is a constant temperature of 25 degrees C. or more to less than 100 degrees C., preferably 25 degrees C. or more to less than 80 degrees C. or less, further preferably 25 degrees C. or more to 60 degree C. or less, provided that the temperature T' is lower than the temperature T. In this process, the temperature may be changed in steps between the temperature T and T'.

The second invention is a method for purifying the composition further comprising the perfluoropolyether having no carboxyl group at any terminal, hereinafter referred to as a non-functionalized perfluoropolyether. That is, the composition subjected to chromatography comprises the perfluoropolyether having a carboxyl group at one terminal, the perfluoropolyether having carboxyl groups at both terminals and the non-functionalized perfluoropolyether. This method comprises the following step (i') or (ii').

(i') The moving phase is at a constant temperature, $T_0$, of 25 degrees C. or higher to 150 degrees C. or lower and a constant pressure, $P_1$, of 7 MPa or higher to lower than 30 MPa to thereby collect a fraction containing the non-functionalized perfluoropolyether at a higher ratio and, subsequently, the pressure of the moving phase is increased to a constant temperature, $P_2$, which is higher than 7 MPa to 30 MPa or lower and is higher than the aforesaid pressure $P_1$ to thereby collect a fraction containing the perfluoropolyether having a carboxyl group at one terminal at a higher ratio. In this step, the temperature of the moving phase remains at the aforesaid temperature $T_0$. The temperature may slightly change.

(ii') The moving phase is at a constant temperature, $T_1$, of higher than 25 degrees C. to 150 degrees C. or lower and a constant pressure, $P_0$, of 7 MPa or higher to 30 MPa or lower to thereby collect a fraction containing the non-functionalized perfluoropolyether at a higher ratio and, subsequently, the temperature of the moving phase is decreased to a constant temperature, $T_2$, which is 25 degrees C. or higher to lower than 150 degrees C. and is lower than the aforesaid temperature $T_1$ to thereby collect a fraction containing the perfluoropolyether having a carboxyl group at one terminal at a higher ratio. In this step, the pressure of the moving phase remains at the aforesaid pressure $P_0$. The temperature may slightly change.

In the process comprising the aforesaid step (i'), the temperature of the moving phase is preferably fixed. In the process comprising the aforesaid step (ii'), the pressure of the moving phase is preferably fixed. As stated for the aforesaid first invention, when the temperature is fixed, the solubility of the compound having a functional group in the moving phase is higher with a higher pressure of the moving phase. When the pressure is fixed, the solubility of the compound having a functional group in the moving phase is higher with a lower temperature of the moving phase. In the second invention, according to any one of the steps (i') and (ii'), a fraction containing the perfluoropolyether having a carboxyl group at one terminal at a higher ratio is collected. That is, the content of the perfluoropolyether having a carboxyl group at one terminal increases in the composition.

In the second invention, the aforesaid higher ratio means that the composition comprising the perfluoropolyether having a carboxyl group at one terminal preferably at 80 mole % or more, more preferably 90 mole % or more, further preferably 95 mole % or more, relative to a total mole of the perfluoropolyether having a carboxyl group at one terminal, the perfluoropolyether having carboxyl groups at both terminals and the non-functionalized perfluoropolyether. Further, the aforesaid high ratio of the non-functionalized perfluoropolyether means that the composition comprises the non-functionalized perfluoropolyether preferably at 90 mole % or more, more preferably 95 mole % or more, further preferably 100 mole %. In the present invention, the pressure of the moving phase means the pressure of the moving phase in a high pressure vessel and the temperature of the moving phase means the temperature of the moving phase in a high pressure vessel.

The carbon dioxide used as a moving phase is in a supercritical or subcritical state. Carbon dioxide has the critical temperature of 31.1 degrees C. and the critical pressure of 7 MPa. In the present invention, the carbon dioxide may be in a subcritical state and not is limited to be in a supercritical state. The pressure of the carbon dioxide in the present invention is in the range of from 7 MPa to 35 MPa, preferably in the range of from 8 MPa to 30 MPa. The temperature of the carbon dioxide is in the range of from 25 degrees C. to 150 degrees C., preferably in the range of from 30 degrees C. to 100 degrees C. The flow rate of the moving phase may be properly selected and not limited to any particular one. In a case where a volume of an extraction vessel used is large, a large flow rate is preferred. The volume of the extraction vessel may be properly selected, depending on an amount of the composition to be purified.

In particular, in the aforesaid step (i'), $P_1$ is preferably 7 MPa or more to 25 MPa or less, and further preferably 7 MPa or more to 22 MPa or less, and $P_2$ is preferably more than 7 MPa to less than 30 MPa, preferably 8 MPa or more to less than 30 MPa, and further preferably 8 MPa or more to 25 MPa or less, provided that $P_2$ is higher than P. In the aforesaid step (ii'), $T_1$ is preferably 40 degrees C. or more to 150 degrees C. or less, and $T_2$ is 28 degrees C. or more to less than 150 degrees C., preferably 30 degrees C. or more to 100 degrees C. or less, further preferably 30 degrees C. or more to 80 degrees C. or less, provided that $T_2$ is lower than $T_1$.

In the second invention, the chromatography may further comprise the following step (i") after aforesaid step (i') or the following step (ii") after aforesaid step (ii').

(i") The pressure of the moving phase is increased to a constant pressure, $P_3$, which is higher than 7 MPa to 35 MPa or lower and is higher than the aforesaid pressure $P_2$ to thereby collect a fraction containing the perfluoropolyether having carboxyl groups at both terminals at a higher ratio. In this step, the temperature of the moving phase remains at the aforesaid temperature $T_0$. The temperature may slightly change.

(ii") The temperature of the moving phase is decreased to a constant temperature, $T_3$, which is 25 degrees C. or higher to lower than 100 degrees C. and is lower than the aforesaid temperature, $T_2$, to thereby collect a fraction containing the perfluoropolyether having carboxyl groups at both terminals at a higher ratio. In this step, the pressure of the moving phase remains at the aforesaid pressure $P_0$. The temperature may slightly change.

According to the aforesaid step (i") or (ii"), a fraction containing a larger amount of the perfluoropolyether having carboxyl groups at both terminals can be collected.

In the process comprising the aforesaid step (i'), the pressures of the moving phase $P_1$, $P_2$ and $P_3$ are set, depending on the molecular weight of the polymer contained in the composition and the extraction temperature $T_0$. For instance, when the polymer contained in the composition has a weight average molecular weight of 1,000 or more to less than 3,000, the extraction temperature $T_0$ may be a constant temperature in the range of from 25 degrees C. to 150 degrees C., preferably in the range of from 30 degrees C. to 80 degrees C. The pressure $P_1$ is a constant pressure of 7 MPa or more to 20 MPa or less, preferably 7 MPa or more to 15 MPa or less, and the pressure $P_2$ is a constant pressure of 8 MPa or more to 25 MPa or less, preferably 10 MPa or more to 20 MPa or less, provided that the pressure $P_2$ is higher than the pressure $P_1$. In the step (i"), the pressure $P_3$ is a constant pressure of 10 MPa or more to 30 MPa or less, preferably 15 MPa or more to 30 MPa or less, provided that the pressure $P_3$ is higher than the pressure $P_2$.

When the polymer contained in the composition has a weight average molecular weight of 3,000 or more to less than 5,000, in particular 3,000 or more to 4,500 or less, the extraction temperature $T_0$ may be a constant temperature in the range of from 25 degrees C. to 150 degrees C., preferably in the range of from 30 degrees C. to 80 degrees C. The pressure $P_1$ is a constant pressure of 7 MPa or more to 20 MPa or less, preferably 8 MPa or more to 18 MPa or less, and the pressure $P_2$ is a constant pressure of 8 MPa or more to 27 MPa or less, preferably 10 MPa or more to 22 MPa or less, provided that the pressure $P_2$ is higher than the pressure $P_1$. In the step (i"), the pressure $P_3$ is a constant pressure 10 MPa or more to 30 MPa or less, preferably 15 MPa or more to 30 MPa or less, provided that the pressure $P_3$ is higher than the pressure $P_2$.

When the polymer contained in the composition has a weight average molecular weight of 5,000 or more to 7,000 or less, the extraction temperature $T_0$ may be a constant temperature in the range of from 25 degrees C. to 150 degrees C., preferably in the range of from 30 degrees C. to 80 degrees C. The pressure $P_1$ is a constant pressure of 7 MPa or more to 22 MPa or less, preferably 8 MPa or more to 20 MPa or less, and the pressure $P_2$ is a constant pressure of 8 MPa or more to 30 MPa or less, preferably 10 MPa or more to 25 MPa or less, provided that the pressure $P_2$ is higher than the pressure $P_1$. In the step (i"), the pressure $P_3$ is a constant pressure of 10 MPa or more to 30 MPa or less, preferably 15 MPa or more to 30 MPa or less, provided that the pressure $P_3$ is higher than the pressure $P_2$.

In the process comprising the aforesaid step (ii'), the temperatures of the moving phase $T_1$, $T_2$ and $T_3$ are set depending on the molecular weight of the polymer comprised in the composition and the extraction pressure $P_0$. For instance, when the polymer contained in the composition has a weight average molecular weight of 3,000 to 5,000, the extraction pressure $P_0$ may be a constant pressure in the range of from 7 MPa to 30 MPa, preferably in the range of from 8 MPa to 25 MPa. The temperature $T_1$ is a constant temperature of 40 degrees C. or more to 150 degrees C. or less, preferably 50 degrees C. or more to 100 degrees C. or less, and the temperature $T_2$ is a constant temperature of 30 degrees C. or more to 100 degrees C. or less, preferably 35 degrees C. or more to 90 degrees C. or less, further preferably 40 degrees C. or more to 80 degree C. or less, provided that the temperature $T_2$ is lower than the temperature $T_1$. In the step (ii"), the temperature $T_3$ is a constant temperature of 25 degrees C. or more to less than 100 degrees C., preferably 25 degrees C. or more to 60 degrees C. or less, provided that the temperature $T_3$ is lower than the temperature $T_2$.

In the methods of the first and second inventions, periods to collect fractions may be properly decided, depending on molecular weights and amounts of the polymers in the composition. For instance, structures of compounds contained in fractions may be monitored. Monitoring may be conducted by IR absorption.

The stationary phase used in the methods of first and second inventions is silica gel. The silica gel may be properly selected from commercial products. The silica gel is preferably spherical. A particle diameter of the silica gel is preferably 30 to 300 μm, further preferably 40 to 100 μm. The silica gel has preferably pH in a range between a weak acid and neutral. The silica gel preferably has pH between 5 and 7.5, further preferably 6.5 and 7.5, as determined on a water dispersion at 25 degrees C. containing 10 weight % of the silica gel. If basic silica gel is used, a carboxyl group in the perfluoropolyether is trapped by the silica gel, so that the perfluoropolyether having a carboxyl group may not be collected. The aforesaid determination of pH is as the Japanese Industrial Standards (JIS) Z 0701, Silicagel Desiccants for Packaging.

When an anion-exchange resin as described in Patent Literature 3 is used as a stationary phase, a fraction containing the perfluoropolyether having a carboxyl group at one terminal at a higher ratio cannot be obtained. In contrast, on account of the use of the aforesaid silica gel as a stationary phase, a fraction containing the perfluoropolyether having a carboxyl group at one terminal at a higher ratio can be obtained.

Composition Comprising Perfluoropolyether Having a Carboxyl Group at One Terminal One of the compositions used in the present method comprises the perfluoropolyether having a carboxyl group at one terminal and the perfluoropolyether having carboxyl groups at both terminals. The other composition used in the present method comprises the perfluoropolyether having a carboxyl group at one terminal, the perfluoropolyether having carboxyl groups at both terminals, and the perfluoropolyether having no functional group at any terminal. A functional group at the terminal of the compound in a composition subjected to chromatography according to the present method needs to have carboxyl groups in advance.

The perfluoropolyether has a polyfluorooxyalkylene structure which has plural repeating units represented by the formula: $—C_jF_{2j}O—$, wherein j is an integer of 1 or more, preferably an integer of from 1 to 6, preferably 1 to 4. In particular, the polyfluorooxyalkylene structure has 10 to 500, preferably 15 to 200, more preferably 20 to 100, further preferably 25 to 80 repeating units.

The repeating unit, $—C_jF_{2j}O—$, may be linear or branched. Examples of the repeating unit include the following, where the polyfluorooxyalkylene structure may be a combination of two or more kinds of the following units.

—$CF_2O$—
—$CF_2CF_2O$—
—$CF_2CF_2CF_2O$—
—$CF(CF_3)CF_2O$—
—$CF_2CF_2CF_2CF_2O$—
—$CF_2CF_2CF_2CF_2CF_2O$—
—$C(CF_3)_2O$—

The aforesaid polyfluorooxyalkylene structure is particularly ones represented by the following formula:

$$—(CF_2)_d—(OCF_2)_p(OCF_2CF_2)_q(OCF_2CF_2CF_2)_r(OCF_2CF_2CF_2CF_2)_s—O(CF_2)_d—,$$

wherein d is an integer of from 0 to 5, p and q are, independently of each other, an integer of from 5 to 300, r and s are, independently of each other, an integer of from 0 to 100, and a total of p, q, r and s is 10 to 500, preferably 15 to 200, and the parenthesized units may be sequenced at random.

The perfluoropolyether having a carboxyl group at one terminal has the aforesaid polyfluorooxyalkylene structure and a carboxyl group at one terminal. For instance, the compound is represented by the following formula (a):

$$A-Rf—B \tag{a}$$

wherein Rf is a linear or branched polyfluorooxyalkylene group which may have 10 to 500, preferably 15 to 200, more preferably 20 to 100, further preferably 25 to 80 repeating units, represented by the formula: $—OC_jF_{2j}O—$, wherein j is as defined above.

The Rf is particularly represented by the following formula:

$$—(CF_2)_d—(OCF_2)_p(OCF_2CF_2)_q(OCF_2CF_2CF_2)_r(OCF_2CF_2CF_2CF_2)_s—O(CF_2)_d—$$

wherein d, p, q, r and s are as defined above.

Further, it is preferable that the Rf has 5 to 80 units represented by the formula ($OCF_2$) and 5 to 80 units represented by the formula ($OCF_2CF_2$) and a total number of the units ($OCF_2$) and ($OCF_2CF_2$) is 20 to 150.

In the formula (a), A and B are a carboxyl group or a —$CF_3$ group and either of A and B is a carboxyl group.

The perfluoropolyether having carboxyl groups at both terminals has the aforesaid polyfluorooxyalkylene structure and carboxyl groups at the both terminals. For instance, the compound is represented by the following formula (b):

$$HOOC—Rf—COOH \tag{b}$$

wherein Rf is as defined above.

The non-functionalized perfluoropolyether has the aforesaid polyfluorooxyalkylene structure and no carboxyl group at any terminal. For instance, the compound is represented by the following formula (c):

$$F_3C—Rf—CF_3 \tag{c}$$

wherein Rf is as defined above.

The composition comprising the perfluoropolyether having a carboxyl group at one terminal is prepared by fluorinating a part of terminal groups of perfluoropolyethers having functional groups at the both terminals. The fluorination can be controlled by adjusting the amount of the fed fluorine gas to thereby control the percentage of the fluorination. The number of the $CF_3$ group introduced is preferably 50 to 90%, further preferably 60 to 90%, particularly 65 to 85%, relative to a total number of the terminal groups. If the ratio of the fluorination is smaller than the aforesaid lower limit, the ratio of the both-terminal functionalized polymer increases. If the ratio of the fluorination is larger than the aforesaid upper limit, the ratio of the non-functionalized polymer increases. Therefore, the ratio of the one-terminal functionalized polymer decreases and that is not preferable.

In particular, the ratio of the perfluoropolyether having carboxyl groups at both terminals in the composition before subjected to chromatography is preferably 35 mole % or less, more preferably 30 mole % or less, further preferably 20 mole % or less, further preferably 15 mole % or less, relative to a total amount of the the perfluoropolyether having carboxyl groups at both terminals and the perfluoropolyether having a carboxyl group at one terminal. Then, it is more secured to obtain a fraction containing 85 mole % or more, preferably 90 mole % or more, further preferably 95 mole % or more of the perfluoropolyether having a carboxyl group at one terminal.

The perfluoropolyether having a carboxyl group at one terminal is prepared, for instance, by fluorinating a part of carboxyl groups of perfluoropolyether having carboxyl groups at the both terminals. Alternatively, it is prepared by fluorinating a part of non-carboxyl functional groups of a perfluoropolyether having the functional groups at the both terminals and, then, converting the remaining functional group into a carboxyl group. The non-carboxyl functional group may be a hydroxyl group, an ester group, an acid chloride group and an acid fluoride group. Among them, an acid fluoride group, i.e. —C(=O)—F, is preferable. The conversion of the functional group into a carboxyl group may be conducted in any conventional manners. For instance, the acid fluoride group is reacted with water to give a carboxyl group.

The present method allows one to efficiently and easily prepare, a composition comprising the perfluoropolyether having a carboxyl group at one terminal at a higher ratio, preferably 80% or more, more preferably 90% or more, further preferably 95% or more. Further, according to the present method, a composition comprising the perfluoropolyether having a carboxyl group at one terminal at a higher molar ratio can be prepared from the perfluoropolyether introduced functional groups at the both terminals as a starting compound, even in the case where the perfluoropolyether has a structure such that it is difficult to directly introduce a functional group at only one terminal. In the present method, the molecular weight of the polymer is not limited to any particular one as long as the polymer is soluble in carbon dioxide and, therefore, the present method can be applied to polymers having a wide molecular weight. In particular, the present method is preferably applied to a purification of a perfluoropolyether having a weight average molecular weight of 1,000 to 100,000, further preferably 1,000 to 15,000.

As stated above, the separation and purification method with an ion-exchange resin, as described in Patent Literature 3, uses large amounts of a fluorine solvent and hydrochloric acid and, therefore, is unsuitable to mass production. Purification by thin-film distillation cannot provide a composition, at a higher ratio, containing perfluoropolyether having a carboxyl group at one terminal; and therefore, when the composition is produced in large quantities, may have poor properties. In contrast, the present method is suitable to the mass production and efficiently provides a composition having good properties. Accordingly, the present method is useful for the preparation of starting materials for surface treatment agents, lubricants and elastomers.

For instance, a group having a hydrolyzable group is introduced to the carboxyl group at the terminal of the perfluoropolyether in the composition obtained in the present method to thereby provide a composition containing at a higher ratio a perfluoropolyether having a hydrolyzable group at one terminal. The composition is suitable as a surface treatment agent. Further, the perfluoropolyether having a carboxyl group at one terminal may be converted into derivatives such as acryl, amine or isocyanate derivatives in any publicly known manner.

A group having the hydrolyzable group is, for instance, represented by the following formula:

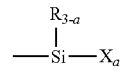

wherein R is an alkyl group having 1 to 4 carbon atoms or phenyl group, X is a hydrolyzable group and a is 2 or 3.

In the afore-mentioned formula (1), X is, independently of each other, any hydrolyzable group. Examples of X include alkoxy groups having 1 to 10 carbon atoms such as methoxy, ethoxy, propoxy and buthoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; and halogen atoms such as chlorine, bromine, and iodine atoms. Among these, methoxy, ethoxy, isopropenoxy groups and a chlorine atom are preferred.

R is preferably a methyl group. "a" is preferably 3 in view of the reactivity and the adhesiveness to a substrate.

The perfluoropolyether having a hydrolyzable group at one terminal and having the aforesaid group represented by the formula (1) may be represented by the following formula (2):

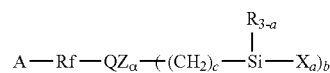

wherein Rf is as defined above, A is a —$CF_3$ group, Q is a divalent organic group, Z is a divalent to octavalent organopolysiloxane moiety having siloxane bonds, R and X are as defined above, a is 2 or 3, b is an integer of from 1 to 7, c is an integer of from 1 to 10, and α is 0 or 1.

In the afore-mentioned formula (2), Q is a linking group to connect Rf with Z, or Rf with the ($CH_2$), group, preferably an organic group having 2 to 12 carbon atoms which may have one or more bonds selected from an amide bond, an ether bond, an ester bond and a vinyl bond. Preferred is a substituted or unsubstituted divalent hydrocarbon group having 2 to 12 carbon atoms which may have one or more bonds selected from an amide bond, an ether bond, an ester bond and a vinyl bond. Examples of Q include the following:

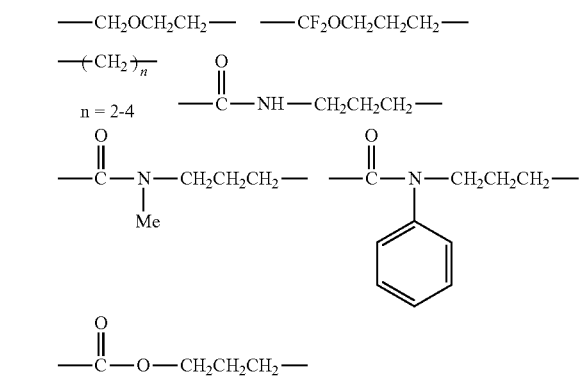

In the afore-mentioned formula (2), Z is a divalent to octavalent organopolysiloxane moiety having siloxane bonds. Z is preferably a liner or cyclic organopolysiloxane moiety having 2 to 13 silicon atoms, preferably 2 to 5 silicon atoms. Z may contain a silalkylene structure where two silicon atoms are bonded via an alkylene group, that is, Si—(CH$_2$)$_n$—Si, wherein n is preferably an integer of from 2 to 6.

Preferably, the organopolysiloxane moiety has an alkyl group having 1 to 8 carbon atoms, preferably 1 to 4 carbon atoms, or phenyl group. The alkylene group in the silalkylene bond preferably has 2 to 6 carbon atoms, more preferably 2 to 4 carbon atoms.

Examples of Z include the following;

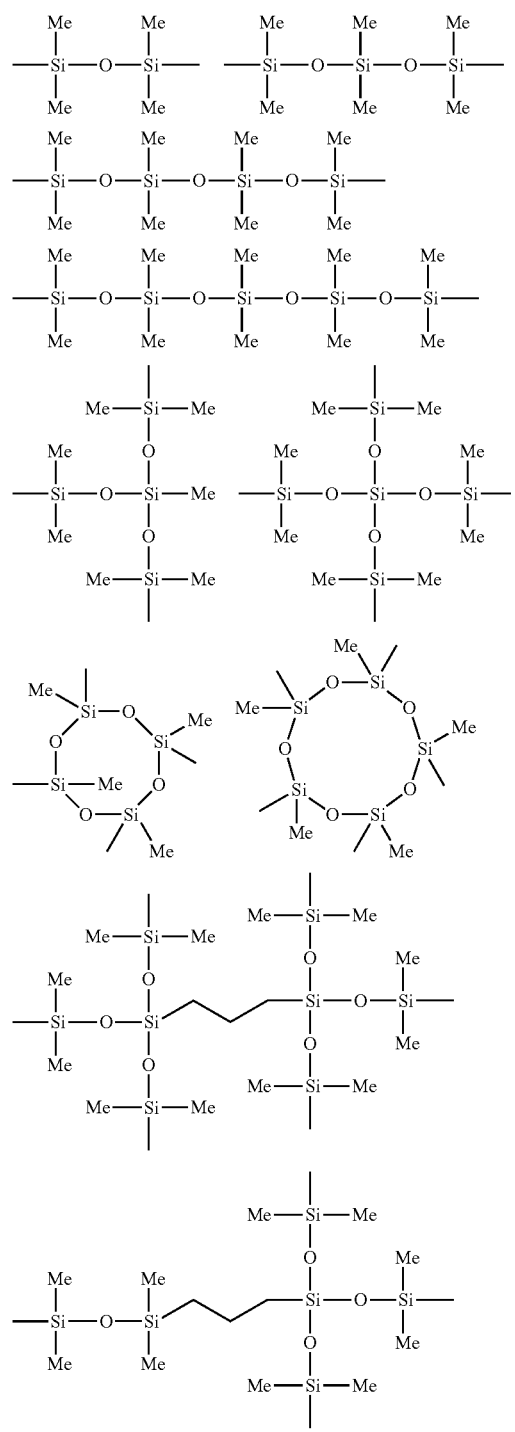

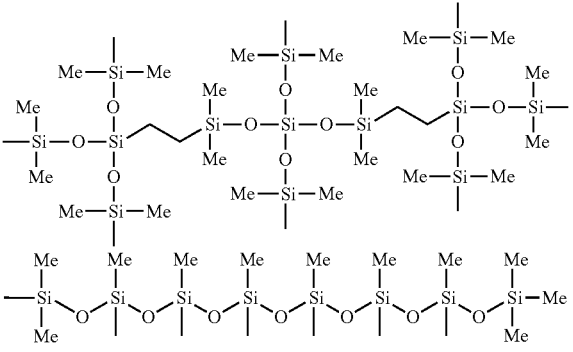

The introduction of the hydrolyzable group may be carried out according to any conventional method, for instance, the methods described in Japanese Patent Application Laid-Open No. 2012-72272, Patent Literature 3, and Japanese Patent Application Laid-Open No. 2012-233157, Patent Literature 2. For instance, the hydrolyzable group is introduced by the following steps (1) to (3).

(1) The terminal carboxyl group of the perfluoropolyether in the composition is reduced with a metal hydride or in a catalytic hydrogenation with a precious metal catalyst to convert apart of carboxyl groups into hydroxyl groups. Examples of the metal hydride include sodium bis (2-methoxyethoxy) aluminium hydride. Examples of the precious metal catalyst include ruthenium.

(2) Then, a compound having an aliphatic unsaturated group is reacted with the terminal hydroxyl group of the perfluoropolyether according to any conventional publicity known method. The aliphatic unsaturated group may be, for instance, an alkenyl group having 2 to 12 carbon atoms. For example, the mixture of perfluoropolyethers obtained in the aforesaid step (1) is reacted with an alkenyl halide such as ally bromide in the presence of tetrabutylammonium hydrogen sulfate, to which sodium hydroxide solution is then added dropwise to make the reaction mixture alkaline to thereby introduce an allyl group at the terminal of the polymer.

(3) Subsequently, a hydrolyzable silyl group is introduced at the aliphatic unsaturated terminal group. This is done by an addition reaction of the perfluoropolyether obtained in the aforesaid step (2) with an organosilicon compound having an SiH group at one terminal and a hydrolyzable group, X, at the other terminal. Examples of the organosilicon compound include a terminal hydrolyzable group-containing organohydrogensilane. The addition reaction may be carried out in the presence of an addition reaction catalyst, such as a platinum compound, according to any conventional method.

According to the aforesaid steps, the composition containing the perfluoropolyether having a hydrolyzable group at one terminal, represented by the formula (2), at a higher ratio can be prepared. This composition is suitable as a surface treatment agent.

The surface treatment agent may comprise a partial hydrolysis and condensation product of the perfluoropolyether represented by the aforesaid formula (2). The partial hydrolysis and condensation is obtained by subjecting a part of the terminal hydrolyzable group (s) of the perfluoropolyether represented by the aforesaid formula (2) to a hydrolysis and condensation reaction in a conventional manner.

The surface treatment agent may contain a catalyst for a hydrolysis and condensation reaction. Examples of the catalyst include organic tin compounds such as dibutyltin dimethoxide and dibutyltin dilaurate; organic titanium compounds such as tetra-n-butyl titanate; organic acids such as acetic acid, methanesulfonic acid and fluorinated carboxylic acid; and inorganic acids such as hydrochloric acid and sulfuric acid. Among these, preferred are acetic acid, tetra-n-butyltitanate, dibutyltin dilaurate and fluorinated carboxylic acid. A content of the catalyst may be a catalytic amount, which ranges typically from 0.01 to 5 parts by mass, particularly from 0.05 to 1 part by mass, relative to 100 parts by mass of the perfluoropolyether and/or the partial hydrolysis and condensation product of the perfluoropolyether.

The surface treatment agent may contain a solvent. Examples of the solvent include fluorinated aliphatic hydrocarbon solvents such as perfluoroheptane and perfluorooctane; fluorinated aromatic hydrocarbon solvents such as m-xylenehexafluoride, benzotrifluoride and 1,3-bis(trifluoromethyl)benzene; fluorinated ether solvents such as methyl perfluorobutyl ether, ethyl perfluorobutyl ether, and perfluoro(2-butyltetrahydrofuran); fluorinated alkylamine solvents such as perfluorotributylamine and perfluorotripentylamine; hydrocarbon solvents such as petroleum benzene, mineral spirits, toluene, and xylene; ketone solvents such as acetone, methylethylketone, and methylisobutylketone. Among these, fluorinated solvents are preferred in view of solubility and wettability of the composition. Particularly preferred are 1,3-bis(trifluoromethyl)benzene, m-xylenehexafluoride, perfluoro(2-butyltetrahydrofuran), perfluorotributylamine and ethyl perfluorobutyl ether.

A mixture of two or more of the aforesaid solvents may be used. Preferably, the perfluoropolyether or the partial hydrolysis and condensation product of the perfluoropolyether is homogeneously dissolved. An optimum concentration of the perfluoropolyether in the solvent may be decided, depending on treatment conditions, and is usually from 0.01 to 30 wt %, preferably from 0.02 to 20 wt %, further preferably from 0.05 to 5 wt %, but not limited to these.

The surface treatment agent may be applied to a substrate by vapor deposition to form a coating having good properties. The vapor deposition may be made by, for instance, resistance heating or electron-beam heating, but not be limited to them. The curing conditions may be selected properly, depending on the surface-treating manner. When the composition is applied by spraying, ink-jetting, brushing or dipping, a curing temperature is preferably in a range of room temperature, i.e. 20 plus or minus 15 degrees C., and 100 degrees C. The curing is carried out preferably in a humid environment to promote the curing reaction. A thickness of a cured coating may be selected, depending on a type of a substrate, and is typically from 0.1 nm to 100 nm, particularly from 1 to 20 nm.

The substrate material to be treated with the surface treatment agent may be of a various types, such as paper, cloths, metals and metal oxides, glass, plastics, ceramics and quartz, but is not limited to these. The present surface treatment agent can provide water- and oil-repellency, a low dynamic friction coefficient or scratch resistance to these substrate materials. In particular, the surface treatment agent is suitable for glass which is treated with $SiO_2$ or plasma, or quartz substrates.

Examples of articles to be treated with the surface treatment agent include glass, hard coat films, high hardness films, anti-reflection films, lenses of spectacles, optical lenses and quartz substrates. In particular, the surface treatment agent is useful for forming a water- and oil-repellent coating on a surface of toughened glasses or anti-reflective coating glasses.

EXAMPLES

The present invention will be explained in detail by reference to the Examples and the Comparative Examples, but shall not be limited thereto. In the following Examples and Comparative Examples, a pressure of the moving phase means a pressure of the moving phase in a high pressure vessel and a temperature of the moving phase means a temperature of the moving phase in a high pressure vessel. The pH of the silica gel was determined according to the Japanese Industrial Standards (JIS) Z 0701, Silicagel Desiccants for Packaging, as pH of a water dispersion containing 10 weight % of the silica gel. Specifically, 200 ml of distilled water was added to 20 g of silica gel, the mixture was heated at 80 degrees C. for 30 minutes and, then, cooled to room temperature and, subsequently, the supernatant was subjected to JIS Z 8802, Methods for determination of pH, to determine pH.

In the Examples and the Comparative Examples, mixtures of the following compounds (1a), (1b) and (1c) were used, hereinafter referred to as compositions F50, F60, F70, F80 and F90. These mixtures were prepared by partially fluorinating carboxyl groups of perfluoropolyethers represented by the following formula (1b) using fluorine gas. The mixtures having the ratio, mole %, described in the following table 1 were prepared by adjusting the amount of the fed fluorine gas. The polymers having a carboxylic group(s) were adsorbed to an acid adsorbent to be separated and, then, a ratio of the polymers described in Table 1 was determined according to $^{19}$F-NMR analysis.

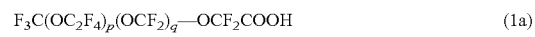

$$F_3C(OC_2F_4)_p(OCF_2)_q\text{—}OCF_2COOH \quad (1a)$$

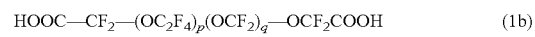

$$HOOC\text{—}CF_2\text{—}(OC_2F_4)_p(OCF_2)_q\text{—}OCF_2COOH \quad (1b)$$

$$F_3C(OC_2F_4)_p(OCF_2)_q\text{—}OCF_3 \quad (1c)$$

(p/q=0.9, p+q was approximately 45)

TABLE 1

| Composition | Fluorination Ratio, % | Ratio of a compound, mole % | | |
|---|---|---|---|---|
| | | (1a) | (1b) | (1c) |
| F50 | 50 | 52 | 24 | 24 |
| F60 | 60 | 56 | 12 | 32 |
| F70 | 70 | 48 | 6 | 46 |
| F80 | 80 | 34 | 3 | 63 |
| F90 | 90 | 18 | 1 | 81 |

Example 1

10 Grams of composition F60 were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 µm. The flow rate of the moving phase was 15 ml/min and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 12 MPa. A fraction was collected at 12 MPa for 60 minutes. Subsequently, the pressure of the moving phase was increased to 18 MPa to collect a fraction for 60 minutes and, then, the pressure of the moving phase was increased to 25 MPa to collect a fraction for 60 minutes. Molar ratios of the components in each fraction were as shown in Table 2. The molar ratios of the components in each fraction were determined by $^{19}$F-NMR analysis.

TABLE 2

| Pressure, MPa | Time, minutes | Amount of a composition in a fraction, g | Molar ratio of a compound, % | | |
|---|---|---|---|---|---|
| | | | (1a) | (1b) | (1c) |
| 12 | 60 | 3.0 | 0 | 0 | 100 |
| 18 | 60 | 4.6 | 92 | 8 | 1 |
| 25 | 60 | 1.0 | 35 | 65 | 0 |

Example 2

10 Grams of composition F70 were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 µm. The flow rate of the moving phase was 15 ml/min and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 12 MPa. A fraction was collected at 12 MPa for 60 minutes. Subsequently, the pressure of the moving phase was increased to 18 MPa to collect a fraction for 60 minutes and, then, the pressure of the moving phase was increased to 25 MPa to collect a fraction for 60 minutes. Molar ratios of the components in each fraction were as shown in Table 3. The molar ratios of components were determined by $^{19}$F-NMR analysis. An amount of a composition collected at 25 MPa was too small to analyze the molar ratio.

TABLE 3

| Pressure, MPa | Time, minutes | Amount of a composition in a fraction, g | Molar ratio of a compound, % | | |
|---|---|---|---|---|---|
| | | | (1a) | (1b) | (1c) |
| 12 | 60 | 4.3 | 0 | 0 | 100 |
| 18 | 60 | 4.0 | 96 | 3 | 1 |
| 25 | 60 | 0.8 | — | — | — |

Example 3

10 Grams of composition F80 were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 µm. The flow rate of the moving phase was 15 ml/min and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 12 MPa. A fraction was collected at 12 MPa for 60 minutes. Subsequently, the pressure of the moving phase was increased to 18 MPa to collect a fraction for 60 minutes and, then, the pressure of the moving phase was increased to 25 MPa to collect a fraction for 60 minutes. Molar ratios of the components in each fraction were as shown in Table 4. The molar ratios of components were determined by $^{19}$F-NMR analysis. An amount of a composition collected at 25 MPa was too small to analyze the component.

TABLE 4

| Pressure, MPa | Time, minutes | Amount of a composition in a fraction, g | Molar ratio of a compound, % | | |
|---|---|---|---|---|---|
| | | | (1a) | (1b) | (1c) |
| 12 | 60 | 6.0 | 0 | 0 | 100 |
| 18 | 60 | 2.9 | 98 | 1 | 1 |
| 25 | 60 | 0.3 | — | — | — |

Example 4

10 Grams of composition F90 were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 µm. The flow rate of the moving phase was 15 ml/min and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 12 MPa. A fraction was collected at 12 MPa for 60 minutes. Subsequently, the pressure of the moving phase was increased to 18 MPa to collect a fraction for 60 minutes and, then, the pressure of the moving phase was increased to 25 MPa to collect a fraction for 60 minutes. Molar ratios of the components in each fraction were as shown in Table 5. The molar ratios of components were determined by $^{19}$F-NMR analysis. An amount of a composition collected at 25 MPa was too small to analyze the component.

TABLE 5

| Pressure, MPa | Time, minutes | Amount of a composition in a fraction, g | Molar ratio of a compound, % | | |
|---|---|---|---|---|---|
| | | | (1a) | (1b) | (1c) |
| 12 | 60 | 7.8 | 0 | 0 | 100 |
| 18 | 60 | 1.5 | 98 | 1 | 1 |
| 25 | 60 | 0.1 | — | — | — |

Example 5

In the Example 5, a mixture of 50 mole % of the following compound (2a), 5 mole % of the following compound (2b) and 45 mole % of the following compound (2c) was used.

$$F_3C(OC_2F_4)_p(OCF_2)_q\text{—}OCF_2COOH \quad (2a)$$

$$HOOC\text{—}CF_2\text{—}(OC_2F_4)_p(OCF_2)_q\text{—}OCF_2COOH \quad (2b)$$

$$F_3C(OC_2F_4)_p(OCF_2)_q\text{—}OCF_3 \quad (2c)$$

(p/q=0.9, p+q was approximately 23)

10 Grams of the mixture were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 μm. The flow rate of the moving phase was 15 ml/min and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 10 MPa. A fraction was collected at 10 MPa for 60 minutes. Subsequently, the pressure of the moving phase was increased to 15 MPa to collect a fraction for 60 minutes and, then, the pressure of the moving phase was increased to 25 MPa to collect a fraction for 60 minutes. Molar ratios of the components in each fraction were as shown in Table 6. The molar ratios of components were determined by $^{19}$F-NMR analysis. An amount of a composition collected at 25 MPa was too small to analyze the component.

TABLE 6

| Pressure, | Time, | Amount of a composition in a | Molar ratio of a compound, % | | |
|---|---|---|---|---|---|
| MPa | minutes | fraction, g | (1a) | (1b) | (1c) |
| 10 | 60 | 4.3 | 0 | 0 | 100 |
| 15 | 60 | 4.8 | 97 | 2 | 1 |
| 25 | 60 | 0.3 | — | — | — |

Example 6

In the Example 6, a mixture of 52 mole % of the following compound (3a), 5 mole % of the following compound (3b) and 43 mole % of the following compound (3c) was used.

$F_3C(OC_2F_4)_p(OCF_2)_q$—$OCF_2COOH$ (3a)

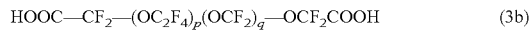

$HOOC$—$CF_2$—$(OC_2F_4)_p(OCF_2)_q$—$OCF_2COOH$ (3b)

$F_3C(OC_2F_4)_p(OCF_2)_q$—$OCF_3$ (3c)

(p/q=0.9, p+q was approximately 60)

10 Grams of the mixture were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5, and the particle diameter of the silica gel was 40 to 100 μm. The flow rate of the moving phase was 15 ml/min, and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 14 MPa. A fraction was collected at 14 MPa for 60 minutes. Subsequently, the pressure of the moving phase was increased to 20 MPa to collect a fraction for 60 minutes and, then, the pressure of the moving phase was increased to 25 MPa to collect a fraction for 60 minutes. Molar ratios of the components in each fraction were as shown in Table 7. The molar ratios of components were determined by $^{19}$F-NMR analysis. An amount of a composition collected at 25 MPa was too small to analyze the component.

TABLE 7

| Pressure, | Time, | Amount of a composition in a | Molar ratio of a compound, % | | |
|---|---|---|---|---|---|
| MPa | minutes | fraction, g | (1a) | (1b) | (1c) |
| 14 | 60 | 4.0 | 0 | 0 | 100 |
| 20 | 60 | 4.9 | 96 | 3 | 1 |
| 25 | 60 | 0.2 | — | — | — |

Example 7

10 Grams of composition F50 were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 μm. The flow rate of the moving phase was 15 ml/min and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 12 MPa. A fraction was collected at 12 MPa for 60 minutes. Subsequently, the pressure of the moving phase was increased to 18 MPa to collect a fraction for 60 minutes and, then, the pressure of the moving phase was increased to 25 MPa to collect a fraction for 60 minutes. Molar ratios of the components in each fraction were as shown in Table 8. The molar ratios of components were determined by $^{19}$F-NMR analysis.

TABLE 8

| Pressure, | Time, | Amount of a composition in a | Molar ratio of a compound, % | | |
|---|---|---|---|---|---|
| MPa | minutes | fraction, g | (1a) | (1b) | (1c) |
| 12 | 60 | 2.0 | 0 | 0 | 100 |
| 18 | 60 | 4.0 | 88 | 11 | 1 |
| 25 | 60 | 1.3 | 32 | 68 | 0 |

The starting composition F50 was composed of 24 mole % of the perfluoropolyether having carboxyl groups at the both terminals, relative to the total moles of the perfluoropolyethers, that is, 31.5 mole %, relative to the total moles of the perfluoropolyether having a carboxyl group at one terminal and the perfluoropolyether having carboxyl groups at both terminals. In one of the fractions collected in the purification of this composition, the ratio of the perfluoropolyether having a carboxyl group at one terminal was 88 mole %. As seen from the results, when the starting composition comprises a larger amount of the perfluoropolyether having carboxyl groups at the both terminals, the molar ratio of the perfluoropolyether having a carboxyl group at one terminal decreases. Therefore, in order to collect a fraction containing 90 mole % or more of the perfluoropolyether having a carboxyl group at one terminal, it is preferred that the molar ratio of the perfluoropolyether having carboxyl groups at the both terminals in the starting composition is 30 mole % or less.

Example 8

10 Grams of composition F70 were passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5 and the particle diameter of the silica gel was 40 to 100 µm. The flow rate of the moving phase was 5 ml/min and the pressure was 13 MPa.

The temperature was decreased from 80 degrees C. to 30 degrees C., as explained below. First, supercritical state carbon dioxide of 80 degrees C. and 13 MPa was passed through the high pressure vessel. A fraction was collected at 80 degrees C. and 13 MPa for 60 minutes. Subsequently, the temperature of the moving phase was decreased to 35 degrees C. to collect a fraction for 60 minutes. Molar ratios of the components in each fraction were as shown in Table 9. The molar ratios of components were determined by $^{19}$F-NMR analysis.

TABLE 9

| Pressure, MPa | Time, minutes | Amount of a composition in a fraction, g | Molar ratio of a compound, % | | |
|---|---|---|---|---|---|
| | | | (1a) | (1b) | (1c) |
| 80 | 60 | 4.0 | 0 | 0 | 100 |
| 35 | 60 | 5.1 | 95 | 3 | 2 |

Example 9

10 Grams of composition F70 were passed through a 25-millilitre high pressure vessel which was filled with silica gel 60, ex Kanto Chemical Co., Ltd., in a dry particle packing method and a supercritical state carbon dioxide was used as a moving phase. The pH of the silica gel at 25 degrees C. was between 5.0 and 7.0, and the particle diameter of the silica gel was 40 to 100 µm. The flow rate of the moving phase was 15 ml/min, and the temperature was 40 degrees C.

The pressure was increased from 8 MPa to 25 MPa, as explained below. First, supercritical state carbon dioxide of 40 degrees C. and 8 MPa was passed through the high pressure vessel. Then, the pressure of the moving phase was increased to 12 MPa. A fraction was collected at 12 MPa for 60 minutes. Subsequently, the pressure of the moving phase was increased to 18 MPa to collect a fraction for 60 minutes and, then, the pressure of the moving phase was increased to 25 MPa to collect a fraction for 60 minutes. Molar ratios of the components in each fraction were as shown in Table 10. The molar ratios of components were determined by $^{19}$F-NMR analysis. An amount of a composition collected at 25 MPa was too small to analyze the molar ratio.

TABLE 10

| Pressure, MPa | Time, minutes | Amount of a composition in a fraction, g | Molar ratio of a compound, % | | |
|---|---|---|---|---|---|
| | | | (1a) | (1b) | (1c) |
| 12 | 60 | 4.7 | 6 | 0 | 94 |
| 18 | 60 | 4.3 | 95 | 3 | 2 |
| 25 | 60 | 0.5 | — | — | — |

As shown in Examples 1 to 9, according to the present method, a fraction containing the perfluoropolyether having a carboxyl group at one terminal at a higher molar ratio is efficiently and easily collected. Thus, a content of the perfluoropolyether having a carboxyl group at one terminal is increased in the composition. In particular, by controlling a molar ratio of the perfluoropolyether having carboxyl groups at both terminals in a starting composition, the molar ratio of the perfluoropolyether having a carboxyl group at one terminal is increased to 90 mole % or more, further 95 mole % or more.

Comparative Example 1

Composition F70 was passed through a 25-millilitre high pressure vessel which was filled with a supercritical state carbon dioxide as a moving phase, without silica gel. The flow rate of the moving phase was 15 ml/min, and the temperature was 50 degrees C.

The pressure was increased from 8 MPa to 20 MPa, as explained below. First, the supercritical state carbon dioxide of 50 degrees C. and 8 MPa was passed through the high pressure vessel. Then, the pressure of the moving phase was increased to 13 MPa. A fraction was collected at 13 MPa for 30 minutes. Subsequently, the pressure of the moving phase was increased to 14 MPa to collect a fraction for 30 minutes, then, the pressure of the moving phase was increased to 15 MPa to collect a fraction for 60 minutes and, then, the pressure of the moving phase was increased to 20 MPa to collect a fraction for 60 minutes. Molar ratios of the components in each fraction are as shown in Table 11.

TABLE 11

| Pressure, MPa | Time, minutes | Amount of a composition in a fraction, g | Molar ratio of a compound, % | | |
|---|---|---|---|---|---|
| | | | (1a) | (1b) | (1c) |
| 13 | 30 | 1.5 | 31 | 4 | 67 |
| 14 | 30 | 4.0 | 45 | 5 | 52 |
| 15 | 60 | 3.5 | 50 | 7 | 43 |
| 20 | 60 | 0.8 | 51 | 6 | 43 |

As shown in table 11, when the silica gel was not used, the molar ratio of the perfluoropolyether having a carboxyl group at one terminal in the faction was not 80 mole % or more in any of the fractions. This is because the polymers tend to be separated depending on a difference in the molecular weight in supercritical extraction without any stationary phase, rather than a difference in the terminal group. In this case, in order to increase a content of the perfluoropolyether having a carboxyl group at one terminal in a fraction, it is necessary to make the molecular weight distribution of the perfluoropolyether narrower or introduce a so large size group at the terminal of the perfluoropolyether as to influence solubility in a supercritical state carbon dioxide. In contrast, according to the present method, a fraction containing the perfluoropolyether having a carboxyl group at one terminal at a higher ratio is efficiently collected.

Comparative Example 2

Composition F70 was passed through a 25-millilitre high pressure vessel which was filled with an anion-exchange resin B-20HG, ex Organo Corporation, and a supercritical state carbon dioxide was used as a moving phase. The flow rate of the moving phase was 15 ml/min and the temperature was 40 degrees C. The pressure was increased from 8 MPa to 25 MPa. Thus, the pressure of the moving phase was increased from 8 MPa to 12 MPa, then to 18 MPa, and then to 25 MPa, as in Example 1. However, the perfluoropolyether having a carboxyl group at one terminal could not be extracted.

Comparative Example 2 demonstrates a case of the anion-exchange resin as a stationary phase, as described in Japanese Patent Application Laid-Open No. 2012-72272. In Comparative Example 2, the carboxylic acid adsorbed on the anion-exchange resin, so that the perfluoropolyether having a carboxyl group at one terminal was not extracted.

Comparative Example 3

Composition F70 was passed through a 25-millilitre high pressure vessel which was filled with silica gel 60 N, ex Kanto Chemical Co., Ltd., in a dry particle packing method and a supercritical state carbon dioxide was used as a moving phase. The pH of the silica gel at 25 degrees C. was between 6.5 and 7.5, and the particle diameter of the silica gel was 40 to 100 µm. The flow rate of the moving phase was 15 ml/min and the temperature was 40 degrees C.

The pressure was 18 MPa, and the temperature and the pressured of the moving phase were not changed, as explained below. First, a fraction was collected for 10 minutes, then, another fraction was collected for 10 minutes and, then, another fraction was collected for 60 minutes. Molar ratios of the components in each fraction were as shown in Table 12.

TABLE 12

| Pressure, MPa | Time, minutes | Amount of a composition in a fraction, g | Molar ratio of a compound, % | | |
|---|---|---|---|---|---|
| | | | (1a) | (1b) | (1c) |
| 18 | 10 | 3.3 | 27 | 6 | 67 |
| 18 | 10 | 3.1 | 43 | 7 | 50 |
| 18 | 60 | 2.5 | 65 | 8 | 27 |

As shown in Table 12, when neither the temperature nor pressure of the moving phase changed during the chromatography, any fraction could not contain the perfluoropolyether having a carboxyl group at one terminal at a higher ratio, i.e. 80 mole % or more.

Industrial Applicability

According to the present method, a composition containing a perfluoropolyether having a carboxyl group at one terminal at a higher molar ratio is efficiently and easily prepared. According to the present method, a composition comprising a perfluoropolyether having a functional group at one terminal at a high molar ratio can be prepared from a perfluoropolyether having functional groups at the both terminals, even in a case where the perfluoropolyether has a structure such that it is difficult to directly introduce a functional group at only one terminal. Further, the present method can be applied to a polymer having a wide molecular weight distribution. Accordingly, the present method is useful for the preparation of starting materials for surface treatment agents, lubricants and elastomers.

The invention claimed is:

1. A method for increasing a ratio of a perfluoropolyether having a carboxyl group at one terminal, relative to a total amount of the perfluoropolyether having a carboxyl group at one terminal and a perfluoropolyether having carboxyl groups at both terminals in a composition comprising these perfluoropolyethers, wherein the method comprises a step of subjecting the composition to chromatography in which a moving phase is a supercritical or subcritical state carbon dioxide and a stationary phase is silica gel, and the moving phase is at a constant temperature, T, in a range of from 25 degrees C. to 150 degrees C. and a constant pressure, P, in a range of from 7 MPa to 30 MPa to thereby collect a fraction containing the perfluoropolyether having a carboxyl group at one terminal at a higher ratio.

2. The method according to claim 1, wherein the aforesaid chromatography further comprises the following step (i) or (ii) after collecting the fraction in the aforesaid process,
   (i) the pressure of the moving phase is increased to a constant pressure, P', which is higher than 7 MPa to 35 MPa or lower and is higher than the aforesaid pressure P to thereby collect a fraction containing the perfluoropolyether having carboxyl groups at both terminals at a higher ratio;
   (ii) the temperature of the moving phase is decreased to a constant temperature, T', which is 25 degrees C. or higher to lower than 100 degrees C. and is lower than the aforesaid temperature T to thereby collect a fraction containing the perfluoropolyether having carboxyl groups at both terminals at a higher ratio.

3. A method for increasing a ratio of a perfluoropolyether having a carboxyl group at one terminal, relative to a total amount of the perfluoropolyether having a carboxyl group at one terminal, a perfluoropolyether having carboxyl groups at both terminals and a perfluoropolyether having no carboxyl group at any terminal, hereinafter referred to as a non-functionalized perfluoropolyether, in a composition comprising these perfluoropolyethers, wherein the method comprises a step of subjecting the composition to chromatography in which a moving phase is a supercritical or subcritical state carbon dioxide and a stationary phase is silica gel and the chromatography comprises the following step (i') or (ii'):
   (i') the moving phase is at a constant temperature, $T_0$, of 25 degrees C. or higher to 150 degrees C. or lower and a constant pressure, $P_1$, of 7 MPa or higher to lower than 30 MPa to thereby collect a fraction containing the non-functionalized perfluoropolyether at a higher ratio and, subsequently, the pressure of the moving phase is increased to a constant temperature, $P_2$, which is higher than 7 MPa to 30 MPa or lower and is higher than the aforesaid pressure $P_1$ to thereby collect a fraction containing the perfluoropolyether having a carboxyl group at one terminal at a higher ratio;
   (ii') the moving phase is at a constant temperature, $T_1$, of higher than 25 degrees C. to 150 degrees C. or lower and a constant pressure, $P_0$, of 7 MPa or higher to 30 MPa or lower to thereby collect a fraction containing the non-functionalized perfluoropolyether at a higher ratio and, subsequently, the temperature of the moving phase is decreased to a constant temperature, $T_2$, which is 25 degrees C. or higher to lower than 150 degrees C. and is lower than the aforesaid temperature $T_1$ to thereby collect a fraction containing the perfluoropolyether having a carboxyl group at one terminal at a higher ratio.

4. The method according to claim 3, wherein the aforesaid chromatography further comprises the following step (i'') after aforesaid step (i') or the following step (ii'') after aforesaid step (ii'),
   (i'') the pressure of the moving phase is increased to a constant pressure, $P_3$, which is higher than 7 MPa to 35 MPa or lower and is higher than the aforesaid pressure $P_2$ to thereby collect a fraction containing the perfluoropolyether having carboxyl groups at both terminals at a higher ratio;
   (ii'') the temperature of the moving phase is decreased to a constant temperature, $T_3$, which is 25 degrees C. or higher to lower than 100 degrees C. and is lower than the aforesaid temperature, $T_2$, to thereby collect a fraction containing the perfluoropolyether having carboxyl groups at both terminals at a higher ratio.

5. The method according to claim 1, wherein the silica gel is such that a water dispersion containing 10 weight % of the silica gel has pH between 5 and 7.5 at 25 degrees C.

6. A method for preparing a composition comprising perfluoropolyether having a carboxyl group at one terminal in an amount of 80 mole % or more, relative to a total mole of perfluoropolyethers, wherein the method comprising a step of collecting a fraction containing the perfluoropolyether having a carboxyl group at one terminal at a higher ratio according to claim 1.

7. The method according to claim 6, wherein the composition before subjected to said chromatography is one prepared by fluorinating a part of carboxyl groups of a perfluoropolyether having carboxyl groups at the both terminals.

8. The method according to claim 6, wherein the composition before subjected to said chromatography is one prepared by the following steps:
   1) a step of fluorinating a part of non-carboxyl functional groups of a perfluoropolyether having the functional groups at the both terminals; and
   2) a step of converting the remaining functional group into a carboxyl group.

9. The method according to claim 8, wherein the functional group is an acid fluoride group.

10. The method according to claim 6, wherein these perfluoropolyethers have the following structure:

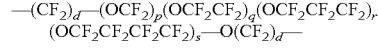

wherein d is an integer of from 0 to 5, p and q are, independently of each other, an integer of from 5 to 300, r and s are, independently of each other, an integer of from 0 to 100, and a total of p, q, r and s is 10 to 500, and the parenthesized units may be sequenced at random.

11. The method according to claim 3, wherein the silica gel is such that a water dispersion containing 10 weight % of the silica gel has pH between 5 and 7.5 at 25 degrees C.

12. A method for preparing a composition comprising perfluoropolyether having a carboxyl group at one terminal in an amount of 80 mole % or more, relative to a total mole of perfluoropolyethers, wherein the method comprising a step of collecting a fraction containing the perfluoropolyether having a carboxyl group at one terminal at a higher ratio according to claim 3.

* * * * *